United States Patent [19]

Parker

[11] 4,137,769
[45] Feb. 6, 1979

[54] METHOD AND APPARATUS FOR DETERMINING INTERNAL TEMPERATURE OF AN OBJECT

[76] Inventor: Robert Parker, 411 Rolling Hills La., Alamo, Calif. 94507

[21] Appl. No.: 875,434

[22] Filed: Feb. 6, 1978

[51] Int. Cl.² ............................................. G01K 11/12
[52] U.S. Cl. ...................................................... 73/356
[58] Field of Search ............. 73/356, 343 R, 432 SD, 73/352; 99/342, 343, 344

[56] References Cited
U.S. PATENT DOCUMENTS

| 83,264 | 10/1868 | Dimock | 99/344 |
|---|---|---|---|
| 3,769,932 | 11/1973 | Romito | 73/356 |
| 4,077,259 | 3/1978 | Foster | 73/352 |

Primary Examiner—S. Clement Swisher
Attorney, Agent, or Firm—E. Herbert Liss

[57] ABSTRACT

A material visually changeable with changing temperature is incorporated internally in a transparent solid body having physical dimensions and thermal conductivity and diffusivity characteristics selected to provide a thermal analog of an object. The object and its analog are exposed to equivalent ambient conditions, concurrently, resulting in a visible change in the thermal analog corresponding to the internal temperature change in the object. The temperature indicating material may include a single transition temperature or multiple temperature indicating materials may be incorporated to display a plurality of transition temperatures and may be reversible or irreversible.

14 Claims, 7 Drawing Figures

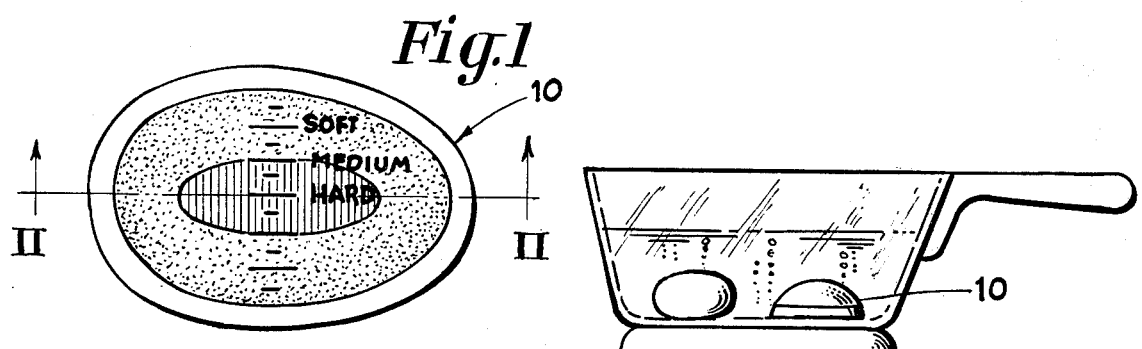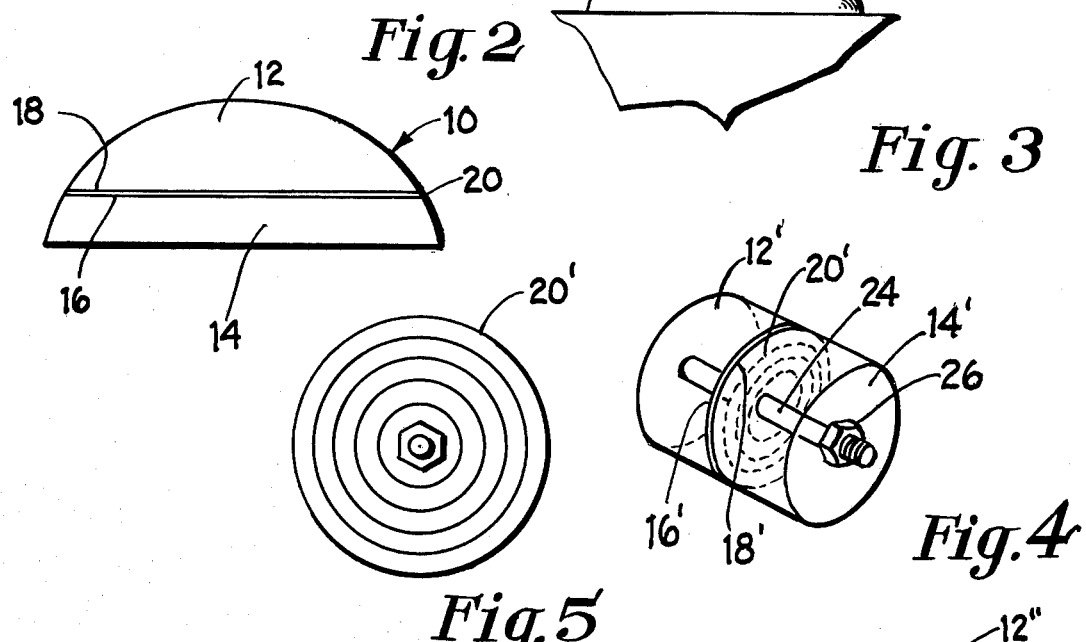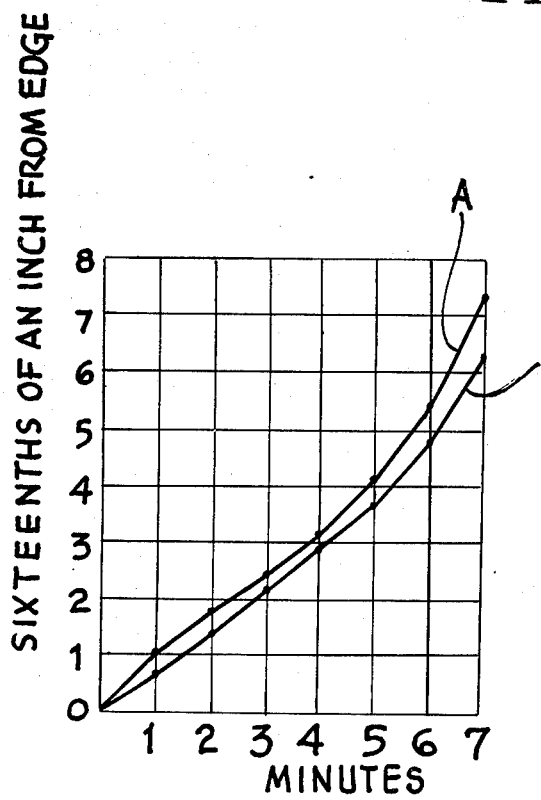

METHOD AND APPARATUS FOR DETERMINING INTERNAL TEMPERATURE OF AN OBJECT

BACKGROUND OF THE INVENTION

The present invention relates to time-temperature indicators and, more particularly, to a time-temperature indicators of the type incorporating thermochromic material and to a method for determining the internal temperature of an object by use of the time-temperature indicator.

The invention is particularly useful in cooking, canning or sterilization. For these purposes it is advantageous and often essential that the temperature at the internal area or volume of an object be determined. As for example, in boiling an egg it is known that egg white and egg yoke coagulate at about 60° to 70° C. Recommended practice is to immerse the egg in cool water and to apply heat. Heating is continued for a preselected length of time after boiling begins. The time is selected on the basis of experiment or experience. However, with the usual method there is really no predictability as to the hardness or softness of the egg. The result depends upon many factors which have not been accounted for. Examples of such factors include variations in the initial temperature of the egg or other object, the burner setting during heating, the heat content of the fuel or the voltage of an electric heating element, or changes in altitude which cause variations in the boiling point of liquids. All of these variables affect the time required for the internal area of the object to reach the desired temperature. The internal state of the object being subjected to temperature change is at best an approximation.

For certain uses it is desirable that the temperature indicator be reversible so that it can be reused. It is also desirable often times to determine that the temperature has dropped throughout the entire volume of the object. For example, it would be undesirable to store some objects in a refrigerator until the temperature dropped to a reasonable level. In other applications, it is advantageous to retain a permanent indication that a desired temperature has been attained throughout the entire volume. This would be true for sterilization and canning, for example. In such cases an irreversible indicator may be suitable to provide a permanent recording of the fact that the heating process has been completed.

Temperature indicating devices using thermochromic material are known in the prior art. These utilize thermochromic material in which the material goes through a spectrum of color changes at different temperatures. They sometimes incorporate thermochromic materials deposited in the shape of numbers which change colors and become visible at the temperature indicated by the particular number. Others are sheet material which give digital readouts or color changes at pre-determined temperatures depending on the precise composition of the material. However, none of the prior art thermochromic temperature indicators are capable of determining internal temperatures after a given exposure time to a change in ambient temperature at the surface. Certain devices of this type are known as, for example, meat thermometers which have pointed probes and can be thrust toward the center of the object being heated. Candy thermometers include a probe which can be inserted into the liquid being heated. However, certain objects cannot have their internal temperature measured in this way without destroying the object. An egg is one example. A sealed container which is undergoing heating for sterilization of the material within it is another example. In canning it is the practice to maintain the lid loosely on the container so that the container can be submerged in the boiling liquid. Use of a thermometer in a container would not be feasible.

SUMMARY OF THE INVENTION

The unique time-temperature indicator of the present invention provides many advantageous features and eliminates most of the problems outlined above. A thermally responsive indicator material is incorporated internally in a solid body of transparent plastic material, preferably of low heat conductivity. The indicator material may be a thermochromic material such as liquid crystal or preferably mercurous oxide which changes colors abruptly at a predetermined temperature. The solid body may be of any suitable or desirable shape as, for example, semi-elipsoid comparable to the shape of an egg for use in boiling an egg. The flat bottom surface assures stability. It may be of cylindrical shape or a rectangular parallelopiped block. A sheet of thermochromic material may be inserted between two parts of the transparent body and the body may be ultrasonically welded or secured by a suitable adhesive. The parts of the body may be secured together by a bolt or clamp so that the thermochromic material can be replaced.

The invention also comprises a method for time-temperature indication wherein the object of which the internal temperature is to be measured and its analog in the form of a plastic body having a temperature indicating material, preferably thermochromic material, incorporated therein is exposed simultaneously to a temperature change. A visual indication such as a color change in the thermochromic material occurs at the same time that the internal area of the object being measured reaches a temperature corresponding to the transition temperature of the temperature indicating material. Further, the method includes storing the object of which the internal temperature is to be measured together with the time-temperature indicator for a period of time and then simultaneously exposing both the time-temperature indicator and the object to a temperature change.

The principal object of the present invention is to provide a method for visually determining the internal temperature of an object having been exposed to a temperature change for a period of time without need to penetrate the material or object of which the temperature is being measured.

Another object of the invention is to provide a device for observing the attainment of a predetermined internal temperature of an object or substance upon exposure to a change in ambient temperature for a period of time without the necessity of penetrating the material.

Other objects and advantages of the invention will be apparent from the following detailed description taken in connection with the accompanying drawings.

DESCRIPTION OF THE DRAWINGS

FIG. 1 is a top elevational view of a semi-elipsoid time-temperature indicator;

FIG. 2 is a section taken on line II—II of FIG. 1 looking in the direction of the arrows;

FIG. 3 is a representational view of a time-temperature indicator and an object whose temperature is being measured when simultaneously exposed to a temperature change;

FIG. 4 is a perspective view of a modified embodiment of the invention illustrating a cylindrical time-temperature indicator;

FIG. 5 is a sectional view of FIG. 4 taken on line V—V of FIG. 4;

FIG. 6 is a perspective view of another embodiment of the invention illustrating a multiple temperature indicator; and FIG. 7 is a graph plotting the movement of the color change from the edge vs. time for two different starting conditions.

DETAILED DESCRIPTION OF THE INVENTION

In FIGS. 1 and 2 there is shown a semi-elipsoid time-temperature indicator 10 comprising a body 10 including a body portion 12 and a base portion 14. The body portion 12 is of semi-elipsoid configuration and the base portion 14 is an elipsoid segment having its upper surface 16 corresponding in shape and size to the lower face 18 of the body portion 12. The portions 12 and 14 may be of transparent plastic material preferably having low heat conductivity. Disposed intermediate the faces 16 and 18 is a layer of temperature indicating material 20. Any suitable material which effects a visual indication at a pre-selected transition temperature may be used for layer 20. Preferably, mercurous oxide which changes from red to black at 70° C. is employed in the illustrated example of a time-temperature indicator for use in preparing an egg. Organic material such as cholesteric type liquid crystals may also be used as a temperature indicating material. These materials are thermotropic or reversible in color with a reversal beyond the transition temperature. Non reversible thermochromic material may also be used to read peak temperatures and to retain a permanent record. Such non reversible heat sensitive material which changes color at a predetermined temperature is sold, under the trademark "TEMP-PLATE" by William Wahl Corporation, Los Angeles, Calif. The non reversible material is particularly useful in sterilization. The portions 12 and 14 may be ultrasonically welded together with the layer of temperature indicating material 20 disposed therebetween. Any other suitable or desirable means for incorporating a layer of temperature indicating material 20 within the plastic body may be employed. For example, a suitable adhesive may alternatively be used which is moisture proof and retains its adhesive characteristics at suitably high temperatures. The portions 12 and 14 could also be mechanically joined as by clamping either permanently or releasably so that the layer 20 can be replaced. Concentric elipses or a set of lines parallel to the major axis of the elipse may be inscribed on the temperature indicating layer and calibrated in terms of time and temperature to show the progress of the heat diffusion toward the central area of the body. In this example the physical geometry of the body corresponds in mass to the physical geometry of an egg and the diffusivity coefficient is equivalent to the diffusivity coefficient of an egg so that the temperature at any given point of the thermochromic material is equivalent to the temperature at the corresponding area of the egg. It will of course be understood that the mass of the time-temperature indicator could be different from the mass of the egg. In this case the temperature at which the thermochromic material used would be selected so that the color change would occur when it reached a temperature which is in reverse relationship to the difference in masses between the egg and the indicator.

In FIGS. 4 and 5 a cylindrical body 10' is shown having a body part 12' and a body part 14'. A layer of temperature indicating low heat conductivity transparent plastic material 20' is positioned between the exposed faces 16' and 18'. Any of the temperature indicating materials employed in the FIG. 1 embodiment would be suitable. In this embodiment the body parts 12' and 14' are held together by a clamping means which may be a bolt 24 extending axially and substantially centrally through the cylindrical body parts 12' and 14' and a nut 26 threaded at the end of the bolt to clamp the body parts together. A bolt with extremely low heat conducting characteristics is, of course, preferred. Although a bolt and nut is shown by way of example it will of course be understood that any other suitable or desirable clamping means may be employed. The thermochromic material 20' may include concentric indicia as, for example, concentric circles or lines parallel to a diameter to indicate the rate of diffusion of heat to the central interior area of the body.

The embodiment illustrated in FIG. 6 incorporates a layer of temperature indicating material which is divided into a plurality of discrete zones (three are shown, by way of example). Each zone utilizes a material which responds with visual indication at a different temperature from the other zones. Thus the progress of the temperature rise at the internal area being measured can be observed.

The body 10" is a rectangular parallelopiped of transparent plastic material comprising a pair of body parts 12" and 14" bonded together with a layer of temperature indicating material 20" such as that used in the hereinabove described embodiments disposed between the body parts. The body parts may be secured together in any suitable or desirable manner as, for example, by solvent bonding, ultrasonic welding or mechanically joined. The temperature indicating material includes three discreet zones 20a, 20b and 20c. By way of example, in zone 20a the optical transition may occur at 30° C., in zone 20b at 50° C. and in zone 20c at 70° C. As the heat diffuses into the internal area each zone will produce a color change, if thermochromic material is used, when it reaches its optical transition temperature at a fixed or calibrated time interval.

In operation, the time-temperature indicator may be stored prior to use in the same ambient temperature environment as the object which is to be measured. As for example, in the case of eggs, both the eggs and the time-temperature indicator may be kept in the refrigerator. Simultaneously an egg and the time-temperature indicator may be placed in a pan of water together and placed over a burner as shown in FIG. 3. As the heat diffuses through both the object and the indicator the temperature of the indicator material will rise. If the preferred mercurous oxide indicator material is used the indicator material will change from red to black as the temperatures rises through 70° C. The black peripheral area will migrate toward the center until the entire indicator is black indicating that the central area has reached 70° C. FIG. 7 is a graph plotting the inward migration of the color change on a time axis showing distance from the edge in 1/16th inches vs. time in minutes for two different starting temperatures. A cylinder body of transparent plastic material one inch high and 1½ inches in diameter was used. A thermochromic material which changes colors at 70° C. was incorporated in the body. The indicator was exposed to water at 100° C. The initial temperature for Curve A was 21.6° and for curve B 4.4° C. A plot such as this can be used to calibrate the indicia referred to hereinabove.

Of course where a plurality of temperature indicator optical transition zones are used as in the FIG. 6 embodiment time-temperature curves must be developed for each zone.

It should now be apparent that a unique time-temperature indicator has been shown in which an analog of the object, the internal temperature of which is being measured, visually indicates the progress of heat diffusion and the inward migration of the predetermined temperature. The device can be calibrated in terms of time-temperature. The indicator may be reversible for re-use or non-reversible to provide a permanent record. It may indicate cooling as well as heating. In addition a unique method has been shown and described for determining attainment of a predetermined internal temperature of an object after exposure to an ambient temperature change for a period of time. This method employs the device of this invention.

Certain specific embodiments of the invention have been shown and described for the purpose of illustration but it will be apparent that various modifications and other embodiments are possible within the scope of the invention. It is to be understood, therefore, that the invention is not limited to the specific arrangements shown, but in its broadest aspects it includes all equivalent embodiments and modifications.

What is claimed is:

1. A time-temperature indicator for visually determining the internal temperature of an object being externally exposed to a temperature change, said indicator comprising a solid body of transparent material having visible temperature indicating means incorporated therein in thermal contact with said solid body, said body having a physical geometry simulating the physical geometry of the object and a coefficient of conductivity such that heat will diffuse through the body in a time period substantially equal to the time period in which heat will diffuse through the object when the object and the indicator are exposed to identical ambient conditions.

2. A time-temperature indicator according to claim 1 wherein said temperature indicating means comprises a layer of thermochromic material.

3. A time-temperature indicator according to claim 1 wherein said temperature indicating means comprises a plurality of sections each responsive to a different temperature whereby a plurality of temperature zones can be observed.

4. A time-temperature indicator according to claim 1 wherein said solid body comprises a pair of transparent plastic body portions sealed together, said indicating means comprising thermochromic material positioned between said body portions, said body portions and said thermochromic material being in thermal contact with each other.

5. A time-temperature indicator according to claim 1 wherein the thermochromic layer is chromatically reversible with reversal in the direction of temperature change.

6. A time-temperature indicator according to claim 2 wherein indicia are provided on said layer of thermochromic material to indicate the extent of the diffusion of heat through the body.

7. A time-temperature indicator according to claim 4 wherein each of said body portions comprises a cylinder.

8. A time-temperature indicator according to claim 4 wherein each of said body portions comprises a rectangular parallelopiped.

9. A time-temperature indicator according to claim 4 wherein one of said body portions is of substantially hemi-ellipsoid configuration and the other of said body portions being an ellipsoid segment having a face corresponding to the base of said one body portion.

10. A time-temperature indicator according to claim 4 wherein said pair of body portions are permanently secured together.

11. A time-temperature indicator according to claim 4 wherein said pair of body portions are releasably clamped together.

12. A time-temperature indicator according to claim 6 wherein the indicia is positioned to define peripheral zones of increasing area to thereby indicate the degree of diffusion of heat toward the central volume of the object.

13. A method for indicating attainment of predetermined internal temperature of an object having its surface exposed to an ambient temperature change by use of an analog time-temperature indicator comprising a body of transparent plastic material having thermochromic material incorporated therein, said body having a diffusivity coefficient relative to the diffusivity coefficient of the object and to the thermochromic material such that color transition occurs in the thermochromic material in a time equivalent to the rate of diffusion of heat through the object necessary to reach said predetermined temperature which method comprises the steps of exposing said object to change in ambient temperature, simultaneously exposing said analog time-temperature indicator to identical changes in ambient temperature, maintaining said object and said time-temperature indicator subject to identical change in ambient temperature until said thermochromic material exhibits a color transition.

14. A method for indicating attainment of a predetermined internal temperature change of an object according to claim 13 comprising the steps of simultaneously exposing said object and said analog time-temperature indicator to identical initial ambient temperature for a sustained period of time; exposing said object and said analog time-temperature indicator to identical change in ambient temperature, maintaining said object and said time-temperature indicator subject to identical change in ambient temperature until said thermochromic material exhibits a color transition.

* * * * *

REEXAMINATION CERTIFICATE (932nd)
United States Patent
Parker

[11] B1 4,137,769
[45] Certificate Issued    Oct. 11, 1988

[54] METHOD AND APPARATUS FOR DETERMINING INTERNAL TEMPERATURE OF AN OBJECT

[76] Inventor: Robert Parker, 411 Rolling Hills La., Alamo, Calif. 94507

Reexamination Request:
No. 90/001,462, Mar. 7, 1988

Reexamination Certificate for:
Patent No.: 4,137,769
Issued: Feb. 6, 1979
Appl. No.: 875,434
Filed: Feb. 6, 1978

[51] Int. Cl.$^4$ .................................. G01K 11/12
[52] U.S. Cl. ........................ 374/134; 99/342; 116/217; 374/162
[58] Field of Search ............ 374/134, 162; 116/217; 99/336, 342

[56] References Cited

U.S. PATENT DOCUMENTS

| | | |
|---|---|---|
| 83,264 | 10/1868 | Dimock . |
| 1,514,535 | 11/1924 | Kovar . |
| 1,777,353 | 10/1930 | Davis . |
| 1,828,628 | 10/1931 | Torgerson . |
| 2,067,016 | 1/1937 | Packer . |
| 2,308,087 | 1/1943 | Lappala . |
| 2,430,290 | 11/1947 | Hann . |
| 2,606,654 | 8/1952 | Davis et al. . |
| 2,660,060 | 11/1953 | Shelton . |
| 2,826,073 | 3/1958 | Huyck et al. . |
| 2,850,393 | 9/1958 | Romito . |
| 2,945,305 | 7/1960 | Strickler . |
| 3,059,474 | 10/1962 | Keller et al. . |
| 3,094,373 | 6/1963 | Luechaurer . |
| 3,125,984 | 3/1964 | Okuyama . |
| 3,175,401 | 3/1965 | Geldmacher . |
| 3,217,165 | 11/1965 | Christianson et al. . |
| 3,311,084 | 3/1967 | Edenbaum . |
| 3,313,266 | 4/1967 | Kelson . |
| 3,430,491 | 3/1969 | Gignilliat, III . |
| 3,465,590 | 9/1969 | Kluth et al. . |
| 3,661,142 | 5/1972 | Flam . |
| 3,700,603 | 10/1972 | Rembaum . |
| 3,701,344 | 10/1972 | Walls et al. . |
| 3,736,861 | 6/1973 | Kroyer et al. . |
| 3,769,932 | 11/1973 | Romito et al. . |
| 3,861,213 | 1/1975 | Parker . |
| 3,864,976 | 2/1975 | Parker . |
| 3,874,240 | 4/1975 | Rembaum . |
| 3,877,411 | 4/1975 | MacDonald . |
| 3,981,683 | 9/1976 | Larsson et al. . |
| 3,998,099 | 12/1976 | Chadwick . |
| 4,077,259 | 3/1978 | Foster . |
| 4,145,186 | 3/1979 | Andersen . |
| 4,156,365 | 5/1979 | Heinmets et al. . |

FOREIGN PATENT DOCUMENTS

| | | |
|---|---|---|
| 95696 | 5/1934 | Japan . |
| 35-17398 | 7/1960 | Japan . |
| 51-450 | 1/1976 | Japan . |
| 204499 | 10/1923 | United Kingdom . |

OTHER PUBLICATIONS

Cordis article entitled "Omni-Atricor Pacemaker, Model 164", dated Nov. 1975.

*Primary Examiner*—D. M. Yasich

[57] ABSTRACT

A material visually changeable with changing temperature is incorporated internally in a transparent solid body having physical dimensions and thermal conductivity and diffusivity characteristics selected to provide a thermal analog of an object. The object and its analog are exposed to equivalent ambient conditions, concurrently, resulting in a visible change in the thermal analog corresponding to the internal temperature change in the object. The temperature indicating material may include a single transition temperature or multiple temperature indicating materials may be incorporated to display a plurality of transition temperatures and may be reversible or irreversible.

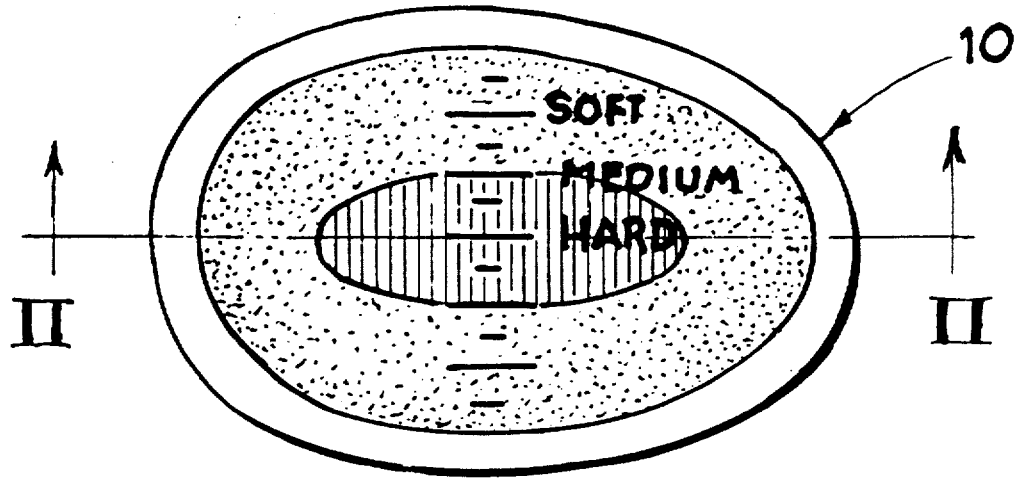

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 16–68 and Column 4, lines 1–3:

In FIGS. 1 and 2 there is shown a semi-elipsoid time-temperature indicator 10 comprising a body 10 including a body portion 12 and a base portion 14. The body portion 12 is of semi-elipsoid configuration and the base portion 14 is an elipsoid segment having its upper surface 16 corresponding in shape and size to the lower face 18 of the body portion 12. The portions 12 and 14 may be of transparent plastic material preferably having low heat conductivity. Disposed intermediate the faces 16 and 18 is a layer of temperature indicating material 20. Any suitable material which effects a visual indication at a pre-selected transition temperature may be used for layer 20. Preferably, mercurous oxide which changes from red to black at 70° C. is employed in the illustrated example of a time-temperature indicator for use in preparing an egg. Organic material such as cholesteric type liquid crystals may also be used as a temperature indicating material. These materials are [thermotropic] *thermochromic* or reversible in color with a reversal beyond the transition temperature. Non reversible [thermochromic] material may also be used to read peak temperatures and to retain a permanent record. Such non reversible heat sensitive material which changes color at a predetermined temperature is sold, under the trademark "TEMP-PLATE" by William Wahl Corporation, Los Angeles, Calif. The non reversible material is particularly useful in sterilization. The portions 12 and 14 may be ultrasonically welded together with the layer of temperature indicating material 20 disposed therebetween. Any other suitable or desirable means for incorporating a layer of temperature indicating material 20 within the plastic body may be employed. For example, a suitable adhesive may alternatively be used which is moisture proof and retains its adhesive characteristics at suitably high temperatures. The portions 12 and 14 could also be mechanically joined as by clamping either permanently or releasably so that the layer 20 can be replaced. Concentric elipses or a set of lines parallel to the major axis of the elipse may be inscribed on the temperature indicating layer and calibrated in terms of time and temperature to show the progress of the heat diffusion toward the central area of the body. In this example the physical geometry of the body corresponds in mass to the physical geometry of an egg and the diffusivity coefficient is equivalent to the diffusivity coefficient of an egg so that the temperature at any given point of the thermochromic material is equivalent to the temperature at the corresponding area of the egg. It will of course be understood that the mass of the time-temperature indicator could be different from the mass of the egg. In this case the temperature at which the thermochromic material used would be selected so that the color change would occur when it reached a temperature which is in reverse relationship to the difference in masses between the egg and the indicator.

AS A RESULT OF REEXAMINATION, IT HAS BEEN DETERMINED THAT:

Claims 2-11, 13 and 14 are cancelled.

Claim 1 is determined to be patentable as amended.

Claim 12, dependent on an amended claim, is determined to be patentable.

New claims 15–23 are added and determined to be patentable.

1. A time-temperature indicator for visually determining the internal temperature of an object being externally exposed to a temperature change, said indicator comprising a solid body of transparent material having a visible [temperature indicating means] *layer of thermochromic material* incorporated therein in thermal contact with said solid body, said body having a physical geometry simulating the physical geometry of the object and a coefficient of [conductivity] *diffusivity* such that heat will diffuse through the body in a time period substantially equal to the time period in which heat will diffuse through the object when the object and the indicator are exposed to identical ambient conditions, *and indicia on said layer of thermochromic material to indicate the extent of the diffusion of heat through said body*.

12. A time-temperature indicator according to claim [6] *1* wherein the indicia is positioned to define peripheral zones of increasing area to thereby indicate the degree of diffusion of heat toward the central volume of the object.

*15. A time-temperature indicator for visually determining the internal temperature of an egg which is exposed to a temperature change comprising*

*a body of plastic material having a transparent upper portion and having a base portion,*
    *said transparent upper portion having a lower face,*
    *said base portion having an upper face,*
  *said lower face corresponding in shape and size to said upper face,*
  *a layer of thermochromic material interposed between said upper portion and said base portion,*
    *said lower face being in thermal contact with one side of said layer of thermochromic material,*
    *said upper face being in thermal contact with the opposite side of said layer of thermochromic material,*
  *said upper portion and said base portion being sealed together and collectively having a physical geometry generally simulating the physical geometry of an egg,*
  *said body having a coefficient of diffusivity such that heat will diffuse through said body in a time period substantially equal to the time period in which heat will diffuse through an egg when said body and an egg are exposed to identical ambient conditions,*
  *said base portion having a lower region shaped to provide stable support for said body,* and indicia on said layer of thermochromic material positioned to define zones extending inwardly from the periphery of said body to thereby indicate the degree of diffusion of heat toward the central volume of said body and hence toward the central volume of an egg so exposed to identical ambient conditions.

16. A device as recited in claim 15 in which said layer of thermochromic material comprises mercurous oxide.

17. A device as recited in claim 15 in which said lower face, said upper face and said layer of thermochromic material are flat, and said layer of thermochromic material extends to a location adjacent the periphery of said body.

18. A device as recited in claim 17 in which said lower region of said base portion has a flat bottom surface for thereby providing said stable support for said body.

19. A method of boiling an egg to a selected degree of doneness, ranging from soft-boiled to hard-boiled, comprising the steps of providing a body of plastic material having a transparent upper portion having a lower face and a base portion having an upper face,
said lower face being formed to correspond in shape and size to said upper face,
interposing a layer of thermochromic material between said upper portion and said base portion such that said lower face is in thermal contact with one side of said layer of thermochromic material and said upper face is in thermal contact with the opposite side of said layer of thermochromic material,
sealing said upper and base portions together,
said body being formed to have a physical geometry generally simulating the physical geometry of an egg and a coefficient of diffusivity such that heat will diffuse through said body in a time period substantially equal to the time period in which heat will diffuse through an egg when said body and an egg are exposed to identical ambient conditions,
providing indicia on said layer of thermochromic material positioned to define zones extending inwardly from the periphery of said body to thereby indicate the degree of diffusion of heat toward the central volume of said body, positioning said body and an egg in a vessel containing water, and
heating said vessel thereby to cause said water to transmit heat into said body and into said egg, said heat operating as the sole factor to cause said layer of thermochromic material to experience a color change migrating inwardly from the periphery of said body and which indicates the temperature change progressively experienced by said egg.

20. The method as recited in claim 19, including, in addition, the steps of forming a substantially flat lower surface on said base portion, and supporting said body on said substantially flat lower surface when said body is so positioned in said vessel.

21. The method as recited in claim 19 in which said lower face, said upper face and said layer of thermochromic material are made to be flat, and said layer of thermochromic material is extended to a location adjacent the periphery of said body.

22. A time-temperature indicator for visually determining the internal temperature of an egg which is exposed to a temperature change comprising a body of plastic material having a transparent upper portion and having a base portion,
said transparent upper portion having a substantially flat lower face,
said base portion having a substantially flat upper face,
said lower face corresponding in shape and size to said upper face,
and a substantially flat layer of thermochromic material interposed between said upper portion and said base portion, and extending to adjacent the periphery of said body,
at least one of said faces being in thermal contact with said layer of thermochromic material,
said upper portion and said base portion being sealed together and collectively having a coefficient of diffusivity such that heat will diffuse through said body in a time period substantially equal to the time period in which heat will diffuse through an egg when said body and an egg are exposed to identical ambient conditions, thereby causing a color change in said layer of thermochromic material which progresses inwardly from the periphery of said body toward the center thereof,
said base portion having a lower region shaped to provide stable support for said body such that said layer of thermochromic material is visible when said body rests on said base portion.

23. A method of boiling an egg to a selected degree of doneness, ranging from soft-boiled to hard-boiled, comprising the steps of providing a body of plastic material having a transparent upper portion having a lower face and a base portion having an upper face,
said lower face being formed to correspond in shape and size to said upper face,
interposing a layer of thermochromic material between said upper portion and said base portion such that said lower face is in thermal contact with one side of said layer of thermochromic material and said upper face is in thermal contact with the opposite side of said layer of thermochromic material,
sealing said upper and base portions together,
said body being formed to have a physical geometry generally simulating the physical geometry of an egg and a coefficient of diffusivity such that heat will diffuse through said body in a time period substantially equal to the time period in which heat will diffuse through an egg when said body and an egg are exposed to identical ambient conditions,
positioning said body and an egg in a vessel containing water, and
heating said vessel thereby to cause said water to transmit heat into said body and into said egg, said heat operating as the sole factor to cause said layer of thermochromic material to experience a color change migrating inwardly from the periphery of said body and which indicates the temperature change progressively experienced by said egg.

* * * * *